United States Patent Office 3,700,408
Patented Oct. 24, 1972

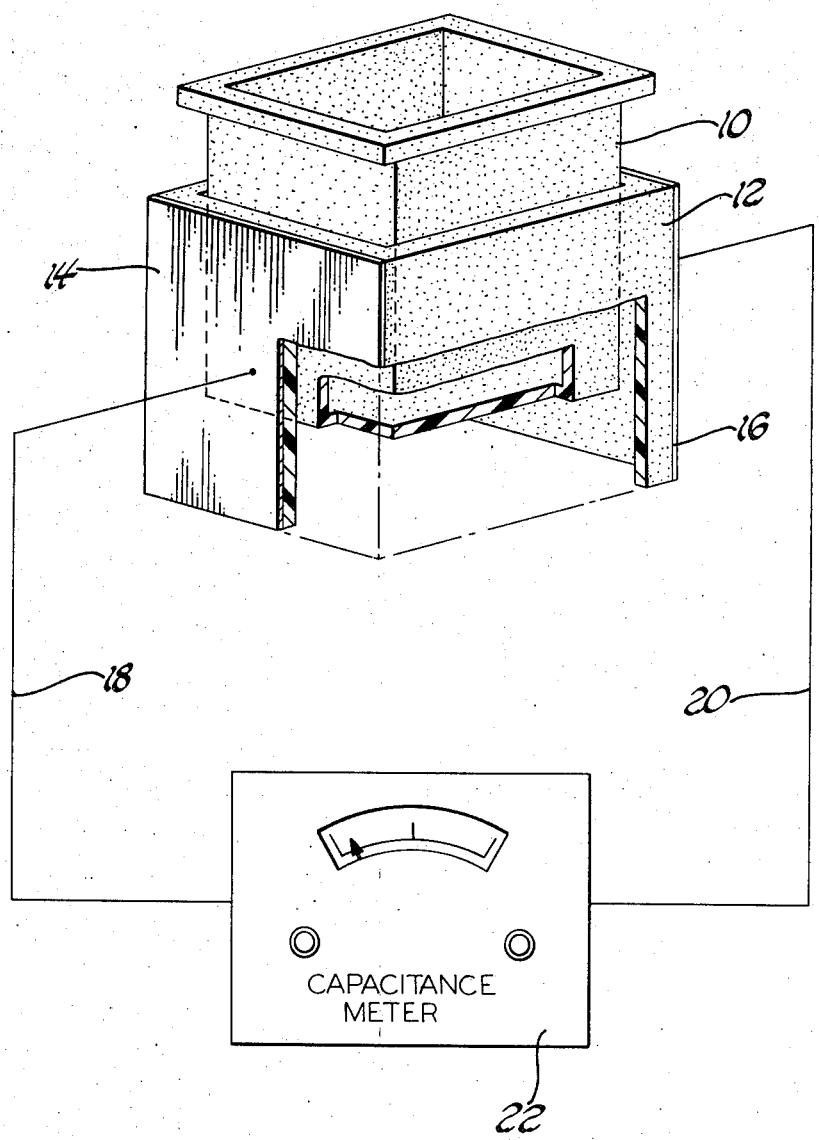

3,700,408
BLOOD CELL AGGREGOMETER
Haim I. Bicher, Charleston, S.C., assignor to Transidyne General Corporation, Ann Arbor, Mich.
Filed Dec. 30, 1970, Ser. No. 102,626
Int. Cl. G01n 27/22, 33/16, 27/26
U.S. Cl. 23—230 B        5 Claims

ABSTRACT OF THE DISCLOSURE

Method for evaluating coagulants and anticoagulants for blood by measuring the capacitive changes of a blood sample to which such quantities are added.

---

This invention relates to hemal analyses and particularly to a method for determining blood platelet aggregation as a function of changes in the dielectric properties of blood.

It has been found that platelet aggregation in blood samples tends to produce a corresponding change in the dielectric properties of the blood sample. Although the utility of the present invention is not to be predicated on the accuracy of the following theories, it is believed that the changes in the dielectric properties of a blood sample with platelet aggregation is due to one or more of the following mechanisms: First, the dielectric change may be due to a redistribution of the platelets within the blood from a disperse configuration to an aggregate configuration. If this theory is correct, then the platelets may be considered as charged particles which, due to the redistributing process, change the electrostatic field in a blood sample. As a second theory, the dielectric changes may be due to changes in the ionic distribution of the blood during the active aggregation process, a phenomenon which may be mainly related to the extrusion of potassium from the platelets. Thirdly, the dielectric change may be due to an alteration in the physical properties of the platelet membrane derived either from configuration changes or a readjustment of its property due to ionic fluxes.

A knowledge of the platelet aggregation of blood samples under varying conditions and when mixed with various compounds, is extremely useful in the study of such hemal conditions as thrombosis and hematasis. Moreover, the knowledge of platelet aggregation is extremely useful in evaluating various drugs which are used for treatment of hemal problems.

It is accordingly the principal objective of the present invention to provide a method by which platelet distribution, either aggregation or dispersion can be readily monitored. In general, the method comprises placing a sample of blood in an enclosed volume between spaced capacitor plates and measuring the change in capacitance across the sample during a change in platelet distribution within the sample.

According to a more specific example of the present invention, the effect of an antiadhesive compound may be determined by placing a blood sample having a predetermined quantity of the antiadhesive compound therein between spaced capacitor plates and adding a platelet aggregation inducing material, such as collagen, to the sample until a predetermined capacitance change is measured as a function of a predetermined platelet aggregation effect. The additional features and advantages of the invention will be made apparent from a reading of the following specification which describes specific examples and embodiments of the invention in detail. This specification is to be taken with the accompanying drawing of which the single figure illustrates in block diagram a suitable arrangement of apparatus for carrying out the invention.

Referring to the figure, the apparatus by which the capacitance measurement may be effected is shown to comprise a small plastic container 10 which defines an enclosed volume for a blood sample of approximately 2 cubic centimeters. Container 10 is adapted to be disposed within a rectangular shell 12 of plastic or other suitable non-conductive material having capacitor plates 14 and 16 suitably bonded to opposite and parallel vertical surfaces thereof. Capacitor plates 14 and 16 are connected by way of conductors 18 and 20 respectively to the inputs of a highly sensitive capacitance meter 22. A suitable electronic capacitance meter is fully described in an article entitled "A High-Sensitivity Capacitance-Meter" by L. E. Haapanen appearing in Electronic Engineering, volume 34, No. 409, March 1962, pages 183 to 185. Other high sensitivity capacitance meters may of course be used as will be apparent to those skilled in the art.

In carrying out the subject invention, a 2 cubic centimeter sample of blood containing an anticoagulant, such as sodium citrate in a ratio of approximately 1 to 10, is placed in plastic container 10 and stabilized in temperature at approximately 37° centigrade. The container 10 is placed in the frame 12 so as to locate the blood sample entirely between the capacitor plates 14 and 16. While constantly stirring the blood sample, platelet aggregation is induced by adding a compound such as collagen, adenosine diphosphate (ADP), adrenaline or 5 hydroxy-triptamine.

The inducement of platelet aggregation produces a capacitive change in the blood sample which is indicated by the capacitance meter 22. A sensitivity of approximately 11,000 volts per picofarad over a working range of 0.008 picofarad is suggested for the capacitance meter 22. Changes in capacitance on the order of 10 to 100 millipicofarads have been experienced in actual practice.

As previously described, the subject invention and the apparatus shown in the figure may be employed to determine the platelet aggregation inhibiting effect of certain drugs. In general, this is accomplished by adding the specific platelet aggregation inhibitor to the blood sample in the container 10 and placing the container between the capacitor plates 14 and 16. The meter 22 is then nulled or set at a minimum reading to establish a standard. The platelet aggregation inducing material is then slowly added to the blood sample while stirring continuously. Temperature stabilization at approximately 37° centigrade has been previously accomplished in accordance with the previous example given. When the capacitance meter 22 indicates a predetermined capacitance change, platelet aggregation is assumed to have occurred and the quantity of aggregation inducer required to produce the capacitance change for a given quantity of antiadhesive drug is noted.

In actual practice, an experimental antiadhesive compound required five micrograms per cubic centimeter of ADP to induce platelete aggregation. In another actual example, a fifty microliter dose of collagen in 2 cubic centimeters of blood was required to induce platelet aggregation using the same antiadhesive experimental compound. In both cases, whole blood samples were used.

By way of variation, it is to be understood that platelet rich plasma samples may be used rather than whole blood, although in accordance with the subject invention, there is no requirement to use such samples. Moreover, the capacitance meter 22 may be interconnected with a strip chart recorder or such other recording device as may be advantageously used to make a permanent record of the results taken. It is to be understood that the foregoing descriptions of specific embodiments are illustrative and should not be construed in a limiting sense.

I claim:

1. A method for measuring changes in platelet distribution in blood comprising the steps of placing a sample of the blood in an enclosed volume between spaced capacitive plates, inducing platelet aggregation in the sample, and measuring the change in capacitance across the sample as an indication of a change in platelet distribution.

2. A method for measuring platelet aggregation in blood comprising the steps of placing a sample of the blood between spaced capacitor plates, inducing platelet aggregation in the sample, and detecting the change in the capacitance of the sample measured across the plates.

3. The method defied in claim 2 wherein the step of inducing platelet aggregation is accomplished by adding an aggregation inducer compound to the blood sample.

4. A method for measuring platelet aggregation in blood comprising the steps of placing a sample of blood containing an anticoagulant in an enclosed volume between a pair of spaced capacitor plates, stabilizing the temperature of the sample, adding a platelet aggregation inducer to the sample while stirring the sample and thereafter measuring the change in capacitance taken across the capacitor plates.

5. A method for determining the effectiveness of an antiadhesive compound in preventing platelet aggregation in blood comprising the steps of placing a sample of blood containing the antiadhesive compound between spaced capacitor plates, adding a platelet aggregation inducer to the sample and monitoring the capacitance across the plates to determine the quantity of platelet aggregation inducer required to produce a predetermined capacitance change.

References Cited

UNITED STATES PATENTS 3,524,727   8/1970   Nöller _____ 23—253 R X

MORRIS O. WOLK, Primary Examiner

R. M. REESE, Assistant Examiner

U.S. Cl. X.R.

23—253 R; 324—61 R, 71 CP